United States Patent
Cummins

(10) Patent No.: US 7,472,421 B2
(45) Date of Patent: Dec. 30, 2008

(54) COMPUTER MODEL OF SECURITY RISKS

(75) Inventor: Fred A. Cummins, Farmington Hills, MI (US)

(73) Assignee: Electronic Data Systems Corporation, Plano, TX (US)

( * ) Notice: Subject to any disclaimer, the term of this patent is extended or adjusted under 35 U.S.C. 154(b) by 871 days.

(21) Appl. No.: 10/259,918

(22) Filed: Sep. 30, 2002

(65) Prior Publication Data

US 2006/0156407 A1 Jul. 13, 2006

(51) Int. Cl.
G06F 15/18 (2006.01)
G06F 12/14 (2006.01)
G06F 15/173 (2006.01)
G06F 15/177 (2006.01)
H04L 9/00 (2006.01)

(52) U.S. Cl. ............... 726/25; 726/23; 713/151; 713/189; 709/221; 709/223

(58) Field of Classification Search ............... 726/23–25
See application file for complete search history.

(56) References Cited

U.S. PATENT DOCUMENTS

| | | | | |
|---|---|---|---|---|
| 5,699,403 A * | 12/1997 | Ronnen | .................... | 379/15.04 |
| 6,535,227 B1 * | 3/2003 | Fox et al. | .................... | 715/736 |
| 6,895,383 B2 * | 5/2005 | Heinrich | ................... | 705/7 |
| 6,907,430 B2 * | 6/2005 | Chong et al. | ................ | 707/100 |
| 6,952,779 B1 * | 10/2005 | Cohen et al. | ................... | 726/22 |
| 7,315,801 B1 * | 1/2008 | Dowd et al. | .................... | 703/13 |
| 2002/0066034 A1 * | 5/2002 | Schlossberg et al. | ........ | 713/201 |
| 2005/0203921 A1 * | 9/2005 | Newman et al. | ............ | 707/100 |
| 2006/0191010 A1 * | 8/2006 | Benjamin | .................... | 726/23 |
| 2007/0121596 A1 * | 5/2007 | Kurapati et al. | ............. | 370/356 |

FOREIGN PATENT DOCUMENTS

EP 1119151 A2 * 7/2001
WO WO 2004031953 A1 * 4/2004

OTHER PUBLICATIONS

Zhou et al, Modeling Network Intrusion Detection Alerts for Correlation, 2007, ACM, pp. 1-31.*
Haag et al, An Artificial Immune System-Inspired Multiobjective Evolutionary Algorithm with Application to the Detection of Distributed Computer Network Intrusions, 2007, ACM, pp. 2717-2724.*
Dantu et al, Risk management using behavior based attack graphs, 2004, IEEE, pp. 445-449.*

(Continued)

*Primary Examiner*—Christopher A Revak
*Assistant Examiner*—Aravind K Moorthy
(74) *Attorney, Agent, or Firm*—Fish & Richardson P.C.

(57) ABSTRACT

The security risk associated with a computer system may be quantified by identifying a computer system, identifying a risk associated with the computer system, the risk relating to an event that may interrupt a normal operating mode of the computer system, determining a likelihood that the event associated with the risk will occur, determining a cost associated with the event occurring on the computer system, and quantifying the risk into an impact value by using the likelihood and the cost.

33 Claims, 6 Drawing Sheets

OTHER PUBLICATIONS

Mihaela Ulieru, Design for Resilience of Networked Critical Infrastructures, 2007, IEEE, pp. 540-545.*

Bodeau D. J., "A Conceptual Model for Computer Security Risk Analysis", Computer Security Applications Conference, 1992 Proceedings, Nov. 30, 1992, pp. 56-63, XP010030989.

Ciechanowicz Z., "Risk Analysis: Requirements, Conflicts and Problems", Computers & Security, Elsevier Science Publishers, Amsterdam, NL, vol. 16, No. 3, 1997, pp. 223-232, XP004093507.

Devargas M., "Survival is Not Compulsory: An Introduction to Business Continuity Planning", Computers & Security, Elsevier Science Publishers, Amsterdam, NL, vol. 18, No. 1, 1999, pp. 35-46, XP004154864.

Fitch, J.A. III et al., "On the Shortest Path to Network Security", Computer Security Applications Conference, 1993 Proceedings, Dec. 6, 1993, pp. 149-158, XP010096765.

Gerber, M. et al., "From Risk Analysis to Security Requirements", Computers & Security, Elsevier Science Publishers, Amsterdam, NL, vol. 20, No. 7, Oct. 31, 2001, pp. 577-584, XP004322838.

Lam, F.K. et al., "A Security Officer's Workbench", Computers & Security, Elsevier Science Publishers, Amsterdam, NL, vol. 15, No. 8, 1996, pp. 695-705, XP004016490.

Niemeyer, R.E., "Applying the TNI to System Certification and Accreditation", Computer Security Applications Conference, Dec. 4, 1989, pp. 248-252, XP010017882.

Trček, D., "An Integral Framework for Information Systems Security Management", Computers & Security, Elsevier Science Publishers, Amsterdam, NL, vol. 22, No. 4, May 4, 2003, pp. 337-360, XP004433001.

Veatch, J.D. et al., "Requirements Driven Methodology for Conducting Risk Analysis of Unclassified Networks", Security Technology, 1995 Proceedings, Oct. 18, 1995, pp. 232-243, XP010196421.

International Search Report, PCT/US03/30082, dated Feb. 26, 2004.

* cited by examiner

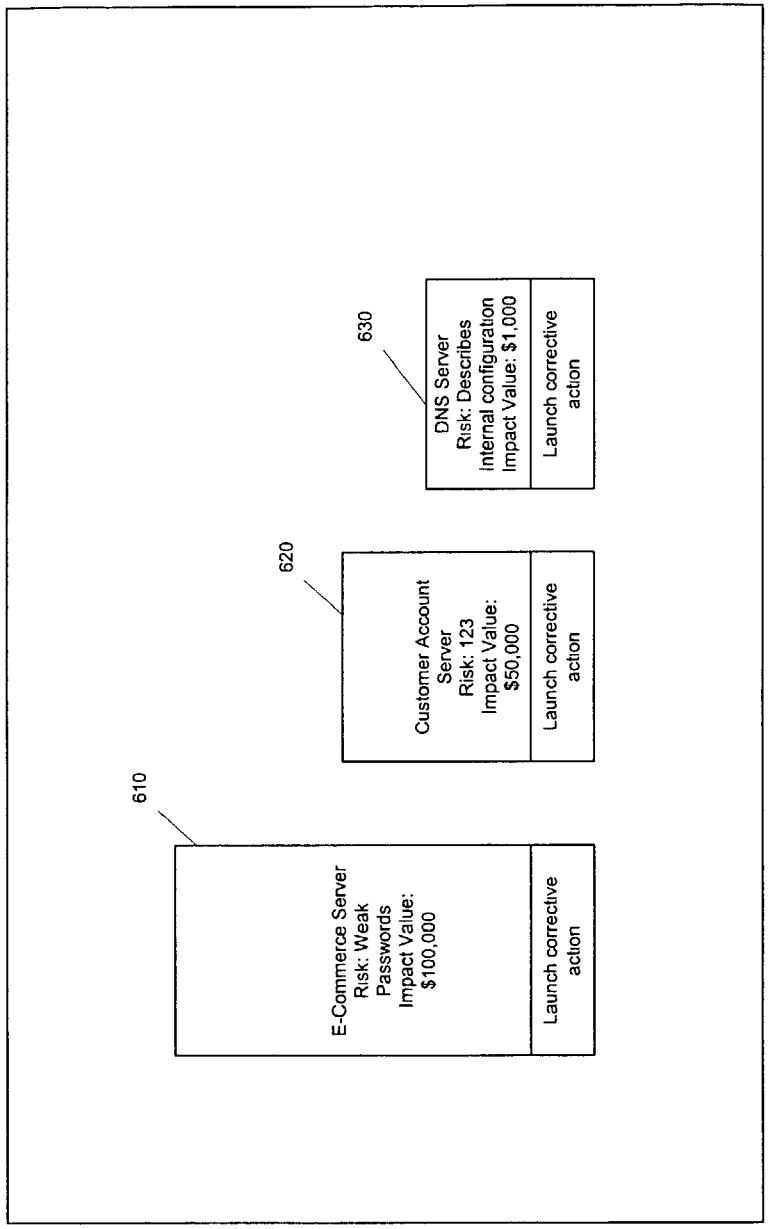

COMPUTER MODEL OF SECURITY RISKS

TECHNICAL FIELD

This document relates to using a computer to automatically model security risks for a computer system.

BACKGROUND

Managing risk for multiple threats and/or multiple computer systems may be problematic. A large number of threats may exist. Each of these threats may place a certain profile of computer systems at risk. Additionally, each of these computer systems may use a different configuration that impacts the risk for each computer system. Furthermore, the list of threats and computer systems may be changing as new attacks are created, new solutions are implemented, and new configurations and applications are installed.

SUMMARY

In one aspect, a security risk associated with a computer system is quantified by identifying a computer system and a risk associated with the computer system. The risk relates to an event that may interrupt a normal operating mode of the computer system. The likelihood and cost of the event are determined, and the risk is quantified into an impact value by using the likelihood and the cost.

Implementations may include one or more of the following features. For example, determining the likelihood may include accessing a data store of risks and associated likelihoods. Identifying a computer system may include identifying multiple computer systems by determining a configuration of a network of computer systems. The cost may relate to expected damages if the event occurred. Determining the likelihood may include analyzing past security events.

A vulnerability path of one or more intermediary systems may be identified, with the vulnerability path comprising a sequence of vulnerabilities in which a first event must interrupt a normal operating mode on a first system before a second event may interrupt a normal operating mode on a second system. An intermediary risk associated with the intermediary systems along the vulnerability path may be identified, and an intermediary likelihood for an event associated with the intermediary risk may be determined. The risk for an end system accessible through the vulnerability path may be quantified by using the intermediary likelihood, a likelihood for the end system, and the cost associated with the event occurring on the end system along the vulnerability path.

The impact value may be displayed. Displaying the impact value may include calculating and displaying multiple impact values. The impact values may be displayed in order of priority or along with a corrective action to address the risk. Displaying the corrective action may include displaying the identity of a resource required to perform the corrective action.

Identifying the risk may include probing the computer system with a software application designed to check for vulnerabilities. Multiple impact values may be compared to create a prioritized vulnerability list.

Implementations may include a system or program capable of achieving the above features, including, for instance, a terminal or a host.

The details of particular implementations are set forth in the accompanying drawings and the description below. Other features will be apparent from the description and drawings, and from the claims.

DESCRIPTION OF DRAWINGS

FIG. 6 is an exemplary GUI showing how risks associated with multiple computer systems may be graphically represented.

Like reference symbols in the various drawings indicate like elements.

DETAILED DESCRIPTION

In general, a security system may automatically quantify a security risk for a computer system. A computer system and risks associated with the computer system are identified, with the risks relating to events that may interrupt the normal operating mode of the computer system. The likelihood and cost of the events associated with the risk are determined, and the risk is quantified into an impact value by using the likelihood and the cost.

For example, a security consultant may survey an organization's network and identify servers, PCs, and network equipment used by the organization. The configuration information for these systems may be determined and the risks associated with these systems may be identified. For example, the profiles of the computer systems may be compared against a threat database that identifies one or more risks. Comparing the computer systems with the risks may identify vulnerable systems. The likelihood of the identified risks may be determined. For example, a common hacker technique may have a high likelihood (e.g., 25%), whereas another risk may have a lower likelihood (e.g., 10%). The cost of the event occurring on the different systems may be determined. A certain vulnerability on a certain system may have a large cost if the computer system serves a vital organization function. For example, an e-commerce server may generate revenues such that interrupting the e-commerce server will interrupt revenues. The cost may include an opportunity cost of unrealized earnings, estimated damages resulting from the interruption, or non-financial values normalized for comparison between different computer systems. An impact value may be determined by multiplying the likelihood and the costs. For example, if the likelihood is 0.1 or 10% and the cost is 1,000,000, then the impact value is 100,000.

Figure 1:
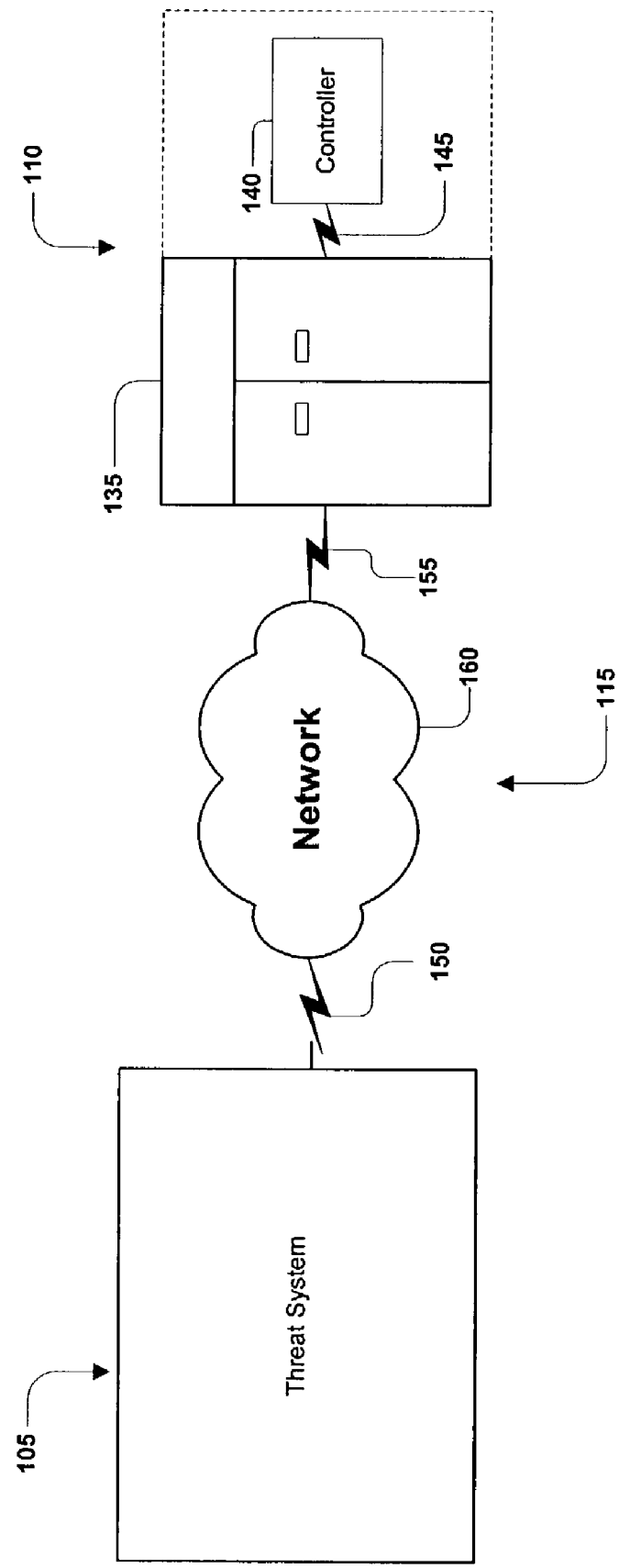
FIG. 1 is a diagram of a communications system in which a threat system may access a host.

Referring to FIG. 1, a communications system 100 is capable of delivering and exchanging data between a threat system 105 and a host system 110 through a communications link 115. Generally, the threat system 105 is a computing system being used to exploit one or more vulnerabilities in a host system 110. These vulnerabilities create risks that a host system administrator may address.

The threat system 105 typically includes one or more threat devices and/or threat controllers. For example, the threat system 105 may include one or more general-purpose computers (e.g., personal computers), one or more special-purpose computers (e.g., devices specifically programmed to communicate with each other and/or the host system 110), or a combination of one or more general-purpose computers and one or more special-purpose computers. The threat system 105 may be arranged to operate within or in concert with one or more other systems, such as, for example, one or more LANs ("Local Area Networks") and/or one or more WANs ("Wide Area Networks"). The threat system 105 typically includes one or more hardware components and/or software components. For example, the threat device may be a general-purpose computer (e.g., a personal computer) capable of responding to and executing instructions in a defined manner.

The communications link 115 typically includes a network 160 that provides direct or indirect communication between the threat system 105 and the host system 110, irrespective of physical separation. Examples of a network 160 include the Internet, the World Wide Web, WANs, LANs, analog or digital wired and wireless telephone networks (e.g., PSTN ("Public Switched Telephone Network"), ISDN, or xDSL), radio, television, cable, satellite, and/or any other delivery mechanism for carrying data. The communications link 115 may include communication pathways 150, 155 that enable communications through the one or more networks 160 described above. Each of the communication pathways 150, 155 may include, for example, a wired, wireless, cable or satellite communication pathway.

The host system 110 includes a host device 135 capable of executing instructions under the command and direction of a host controller 140. The host device 135 is connected to the host controller 140 by a wired or wireless data pathway 145 capable of carrying and delivering data.

The host system 110 typically includes one or more host devices 135 and/or host controllers 140. For example, the host system 110 may include one or more general-purpose computers (e.g., personal computers), one or more special-purpose computers (e.g., devices specifically programmed to communicate with each other and/or the threat system 105), or a combination of one or more general-purpose computers and one or more special-purpose computers. The host system 110 may be arranged to operate within or in concert with one or more other systems, such as, for example, one or more LANs ("Local Area Networks") and/or one or more WANs ("Wide Area Networks").

The host device 135 and host controller 140 each typically includes one or more hardware components and/or software components. An example of a host device 135 is a general-purpose computer (e.g., a personal computer) capable of responding to and executing instructions in a defined manner. Other examples include a special-purpose computer, a workstation, a server, a device, a component, other equipment or some combination thereof capable of responding to and executing instructions. An example of host controller 140 is a software application loaded on the host device 135 for commanding and directing communications enabled by the host device 135. Other examples include a program, a piece of code, an instruction, a device, a computer, a computer system, or a combination thereof, for independently or collectively instructing the host device 135 to interact and operate as described herein. The host controller 140 may be embodied permanently or temporarily in any type of machine, component, equipment, storage medium, or propagated signal capable of providing instructions to the host device 135.

Figure 2:
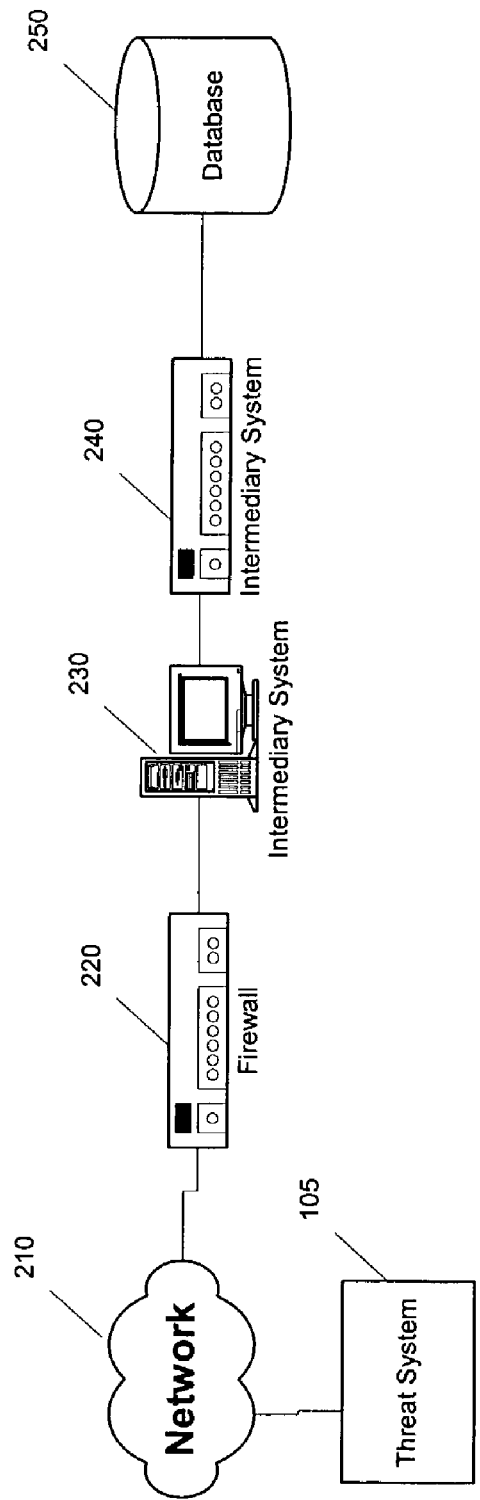
FIG. 2 is a diagram of a communications system showing how a computer system may be vulnerable to a threat.

FIG. 2 shows a communications system 200 that illustrates how a computer system may be at risk to a threat. Specifically, the communications system 200 includes a threat system 105, a network 210, a firewall 220, an intermediary system 230, an intermediary system 240 and a database 250. The threat system 105 may use the network 210, pass through the firewall 220, and compromise the intermediary systems 230 and 240 to access the database 250.

Aspects of the devices in the communications system 200 have been described previously with respect to FIG. 1. For example, the threat system 105 in FIG. 2 relates to the threat system 105 described in FIG. 1. Aspects of the network 210 may resemble aspects of the network 160. Similarly, aspects of the firewall 220, the intermediary systems 230 and 240, and the database 250 may relate to aspects of the host system 110 and the network 160. However, FIG. 2 illustrates how a threat system 105 may use network 210 to create a vulnerability path through the firewall 210, and the intermediary systems 230 and 240 to compromise the end system, database 250. Specifically, the threat system 105 uses network 210 to access firewall 220. Once access through firewall 220 is available, the intermediary system 230 may be compromised. Using intermediary system 230 as a staging area or launching point for an attack, intermediary system 240 may be compromised. In turn, the threat system 105 may use intermediary system 240 as a staging area for an attack on the end system, in this case, database 250. Thus, although the threat system 105 is illustrated as going through network 210, firewall 220, intermediary system 230, intermediary system 240 to compromise database 250, the connection logically illustrates a vulnerability path that may be used to exploit an end system, rather than an actual topology.

The network 210 may include hardware and/or software capable of enabling direct or indirect communications between the threat system 105 and the firewall 220. As such, the network 210 may include a direct link between the threat system 105 and the host 150, or it may include one or more networks or subnetworks between them (not shown). Each network or subnetwork may include, for example, a wired or wireless data pathway capable of carrying and receiving data. Examples of the network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

The firewall 220 includes a computer system configured to selectively filter and forward traffic to prevent hostile or unauthorized access and traffic from accessing an organization's resources. The firewall 220 may include hardware and/or software configured to receive traffic, analyze the traffic, and selectively forward the traffic based on the traffic profile. In one example, the firewall 220 includes a computer (e.g., host system 110) configured to run firewall software, which examines traffic passing through the firewall 220. In another example, the firewall 220 may include an access control list routed through a device such as a router, switch, and/or specialized hardware device configured to perform network filtering and inspection.

The intermediary systems 230 and 240 may include one or more systems configured to support an organization. However, the intermediary systems may be compromised and used as a launching point for attacks on database 250. For example, as shown in FIG. 2, intermediary system 230 includes a server system (e.g., host system 110), configured to provide software services. In one example, the intermediary system 230 may include services such as directory services, or DNS ("Domain Name Services") information. The DNS information and/or directory services may enable a user coming from the network 210 to learn which computer system to access. For example, the intermediary system 230 may direct a user from network 210 to access database 250. However, the intermediary system 230 also may be used by someone with malicious intent to learn configuration and structural information about communications system 200.

A vulnerability in intermediary system 230 may be exploited to enable an unauthorized user to access intermediary system 230. From intermediary system 230, the unauthorized user may attempt to access other systems in an unauthorized manner.

Intermediary system 240 is similar to intermediary system 230 in that it represents an intermediary device that may be used to access one or more systems in communications network 200. However, as shown in FIG. 2, the intermediary system 240 illustrates how a specialized device may be used in support of enabling access to a computer system such as database 250. For example, the intermediary system 240 may include a router, a switch, a hub, or another communications devices configured to route traffic through communications system 200. The intermediary system 240 may include software configured to operate one or more hardware devices. For example, the intermediary system 240 may include a software code segment configured to direct the operations of a router.

The database 250 is a computer system configured to represent one or more assets which may be at risk. Security systems configured to protect the database 250 may include the firewall 220, and/or the intermediary systems 230 and 240. However, in FIG. 2, the database 250 and the intermediary systems 230 and 240 are shown to illustrate how intermediary systems may be used to ultimately exploit a valuable asset, which in this case is database 250. The database may include one or more servers (e.g., host system 110) configured to enable access to information. For example, the database 250 may include a web server, a customer accounts server, and/or other systems designed to store information that others may wish to access in an unauthorized manner. The database 250 may include a software application or code segment running on a server that is shared with other systems. The database 250 may include a database distributed across multiple systems, or a subset of a larger database. In another sense, the database may represent a service provided to other users. For example, Internet access may be made available to subscribers. The database 250 may be compromised by interrupting access to the database, for example, through a denial of service attack. The database 250 also may include one or more other applications, such as, for example, electronic mail services, messaging services, billing services, financial services, and directory services.

Figure 3:
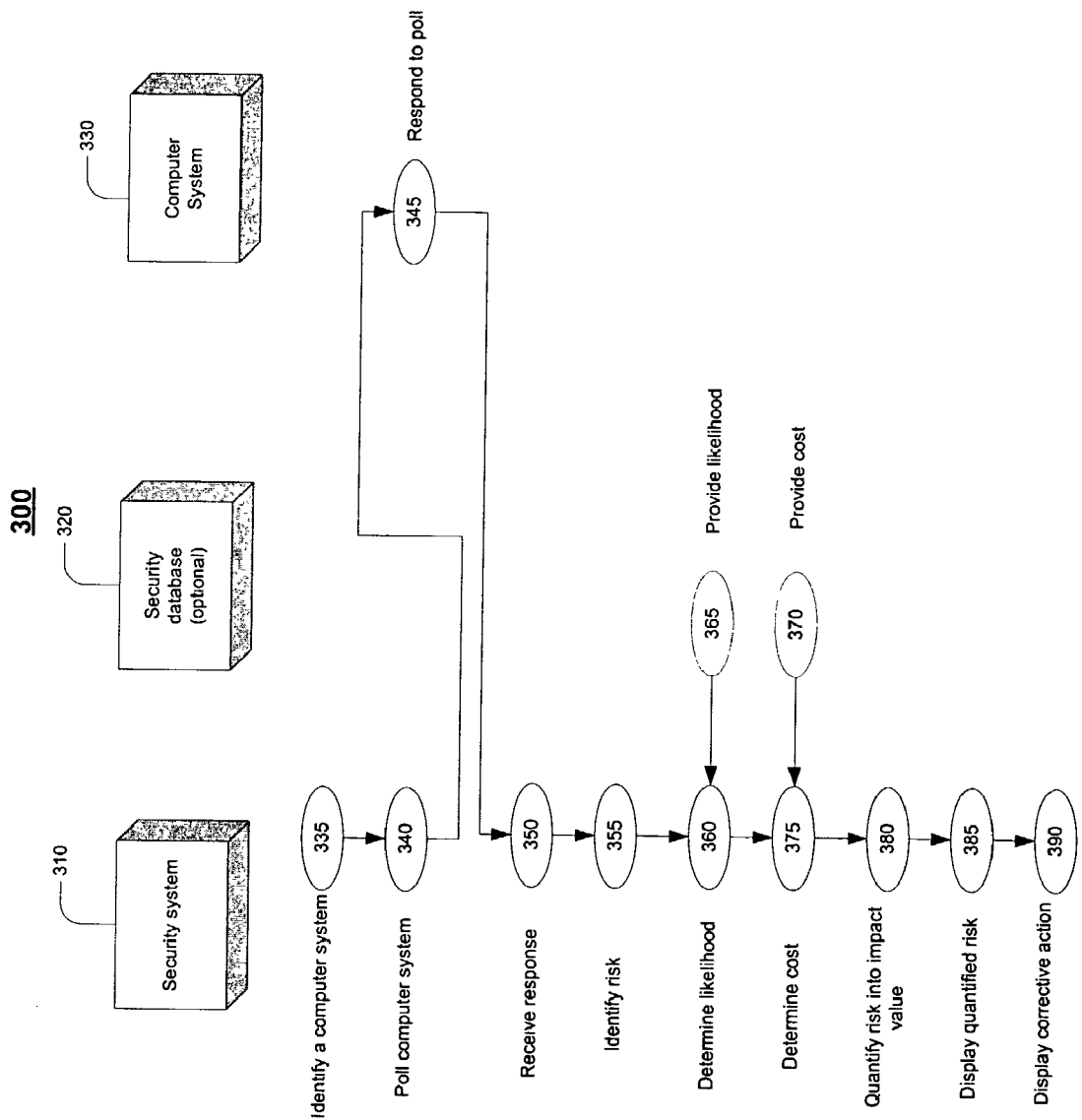
FIG. 3 is a flow chart showing how a security system may identify and manage risks associated with a computer system.

FIG. 3 illustrates a flow chart 300 configured to show how a security system may automatically identify and manage risks associated with one or more computer systems. Generally, aspects of the system shown in flow chart 300 may relate to systems described previously with respect to FIGS. 1 and 2. For example, aspects of the security system 310 and the security database 320 may resemble aspects of the host system 110. Similarly, aspects of the computer system 330 may resemble the host system 110 and the database 250 described with respect to FIGS. 1 and 2. For example, the computer system 330 may include a server designed to support multiple users. However, flow chart 300 illustrates how the security system 310 may identify and poll a computer system to identify risk, determine the likelihood of the risk, determine the cost, quantify the risk into an impact value, and display the quantified risk. Generally, the security system 310 includes a host configured to manage the risk management process. However, although FIG. 3 illustrates security system 310 as one computer system, the security system 310 may be distributed across two or more computer systems.

The security database 320 includes a host configured to provide the likelihood and cost associated with risks to the computer system 330. Generally, the security database 320 may include an application and/or a data store residing on a server. The application may receive a risk or provide a likelihood for that risk.

Security database 320 may be operated by a third party that selectively enables access to the security database as part of a third party service to others. For example, a security management company or an information technology provider may enable access to the security database for one or more clients. In another example, the security database may be provided as a public service.

The computer system 330 represents a computing device configured to support an organization. Depending on the mission of the organization or the configuration of the computer system 330, the value may vary. In one example, the computer system 330 includes an extremely important asset. For example, the computer system 330 may include an e-commerce server. Thus, the organization would desire to secure the computer system 330 so that no vulnerabilities are exploited. In another example, the computer system 330 may represent a less valuable asset, and fewer actions may be taken to secure the computer system 330. Accordingly, flow chart 300 illustrates a process to show how an organization may prioritize the security and risk management associated with an array of several computer systems. This may include taking different corrective actions based on the value of the computer system 330 and/or the costs associated with exploitation of the computer system 330.

Initially, the security system 310 identifies a computer system (step 335). Identifying a computer system may include launching an automated probe of a network. For example, a network administrator may specify a range of IP ("Internet Protocol") addresses for the security system 310, which then goes out and launches a probe to discover computer systems within the network. In one example, the security system 310 classifies the computer systems as client devices, server systems, and/or networking equipment. Another example may identify computer systems by analyzing a log of access to a service, such as an authentication server. In yet another example, the security system 310 identifies a computer system by using a directory of an organization's computer systems. Identifying a computer system may include identifying one or more details associated with the computer system. For example, the operating system, the hardware configuration, the patch state, and/or the software applications may be described when the computer system is identified.

Identifying the computer system may include identifying planned, theoretical, or alternative computer systems. For example, a consultant may be exploring adding one computer system and the effect on risk of an existing network. Identifying the computer system may include creating a virtual computer system in the modeled network.

The security system 310 then polls the computer system 330 (step 340). Polling the computer system may include determining a state for the computer system 330. For example, polling the computer system may include launching an SNMP ("Simple Network Management Protocol") manager configured to poll an SNMP agent on the computer system 330. The security system 310 may poll the network devices in the equipment with SNMP requests. In another example, there may be an SNMP client running on one or more servers and personal computers in the network. Other protocols or programs may be used to poll a computer system. For example, a security system 310 may maintain connections with one or more computer systems 330.

The security system 310 may identify the state of the computer system 330 through monitoring the connection between the security system 310 and the computer system 330.

The computer system 330 responds to the poll (step 345). In one example, responding to the poll includes sending a message indicating that the computer system 330 is alive. In another example, responding to the poll may include providing a more detailed response with hardware and software configurations.

The security system 310 receives the response (step 350). In one example, receiving the response may include receiving a keep-alive message sent by the computer system 330. In another example, receiving the response may include receiving a more detailed configuration message describing the configuration and/or state of the computer system 330.

Receiving the response may include using one or more proxies configured to send and receive polls on behalf of other systems. In one example, there may be a polling collection agent that coordinates polling the systems for the security system 310. In another example, there may be a proxy that responds to polls for the computer system 330. For example, the proxy for the computer system 330 may include the database that describes the computer systems in the organizations network.

The security system 310 identifies the risk (step 355). Identifying the risk may include determining that a risk relates to an event that may interrupt a normal operating mode of the computer system. In one example, the risk may include an unauthorized user getting access to another user's account through weak passwords. Another risk may include a denial of service attack. Yet another risk is that a system will be exploited and the content of the computer system will be posted to the public. There may be more than one risk associated with a computer system. For example, there may be a denial of service attack that is identified along with a weak password that may be exploited.

Identifying the risk also may include assessing the skills and motivation of the population that has access to the computer system or its interfaces. For example, an internal user community may be considered a trusted community and without the skill set to perform a complicated attack. In contrast, the Internet community may include members that are not trusted with sophisticated tools.

The risk or normal operating mode is not limited to an actual intrusion. Interrupting the normal operating mode may include an intermediary system that may be used to launch malicious operations. For example, the normal operating mode of a mail server may be interrupted if the mail server fails to detect a virus. The virus then may interrupt the normal operating mode of a client computer system that accesses the mail message with the virus. Another example of interrupting the normal operating mode may include a firewall that does not filter hostile traffic.

The security system 310 then determines the likelihood of the risk (step 360). With the risks identified, the security system may interface with the security database 320. Specifically, the security database 320 may provide the likelihood that the risk may occur (step 365). Along with determining the likelihood, the security system 310 and the security database 320 may work together to provide and determine the cost for an event associated with the risk occurring (steps 370 and 375). Typically, this may include determining the cost associated with a hostile event for a particular installation or computer system. For example, in one set of circumstances, an identified web server may have a very low cost as the web server is not considered very valuable. By contrast, in another example, the cost of interruption in the web server used in online web retailing may be high.

The security system 310 then quantifies the risk into impact value (step 380). In general, quantifying the risk into an impact value includes relating the likelihood with the cost. For example, the likelihood or probability of a hostile event occurring may be multiplied by the cost (e.g., expected damages) associated with the hostile event occurring. For example, an online web retailer may estimate losses of $1 million a day in the event of a denial of service attack on the retailer's web site. The likelihood of this occurring on that particular web site may be 10%. Thus, the risk may be quantified by multiplying the likelihood by the cost, in this case, $1 million×0.1 or $100,000. Quantifying the risk may include other forms of determining the impact value. For example, rather than use expected damages, the impact value could use a numbering system in which the different computer systems are quantified relative to one another. For example, a domain name server may form part of a critical infrastructure and receive a very high cost associated with it. In contrast, a test bed for a next generation messaging system may have a very low impact and cost associated with it.

The security system 310 may display the quantified risk (step 385). Displaying the quantified risk may include using a graphical user interface to display the computer systems and associated risks with the most serious threat to an organization. Displaying the quantified risk or impact value may include displaying the impact value for more than one system and/or in order of priority. For example, the computer system 330 associated with the largest impact value may be displayed first. Similarly, a system with a lower impact value may be displayed with a smaller graphical icon to reflect the lower impact value.

The impact value may be displayed in association with the corrective action needed to address the risk (step 390). For example, if a particular vulnerability in a server allows the server to be exploited, the impact value may be associated with and displayed next to a corrective action. For example, a particular patch may be installed to address the risk. Displaying the corrective action may include displaying the resources required to perform the corrective action. For example, displaying the corrective action may include displaying that ten contractor hours are required to perform the corrective action.

Figure 4:
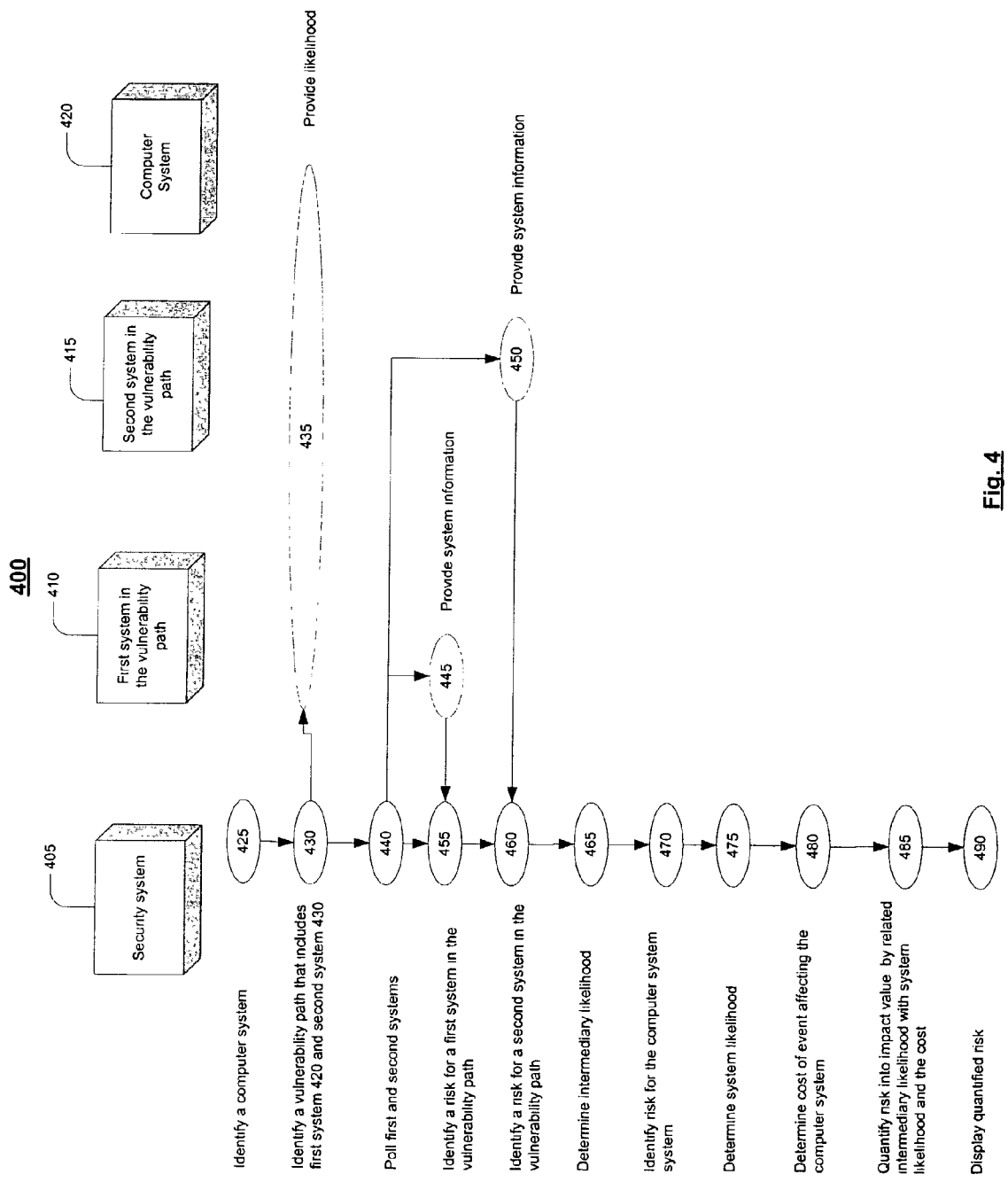
FIG. 4 is a flow chart showing how a security system may manage risks when more than one intermediary system in a vulnerability path may be exploited to expose other systems.

Referring to FIG. 4, a flow chart 400 illustrates how a communications system may manage risk where more than one intermediary system in a vulnerability path may be exploited to create a vulnerability. Aspects of the systems used in flow chart 400 generally have been described previously with respect to FIGS. 1-3. For example, security system 405 may relate to the security system 310 described with respect to FIG. 3. Similarly, the first and second systems 410 and 415 in the vulnerability path may relate to the intermediary systems 230 and 240 described with respect to FIG. 2, and the computer system 420 may relate to the host system 110, the database 250, and the computer system 330 described with respect to FIGS. 1-3. Generally, the flow chart 400 illustrates how a security system 405 may identify a vulnerability path comprising one or more intermediary systems and then determine how the vulnerability path may be used to compromise the computer system 420 accessible through the vulnerability path. Initially, the security system 405 identifies a computer system (step 425). The security system 405 then identifies a vulnerability path that includes the first system 410 and the second system 415 (step 430). Identifying the vulnerability path includes identifying a risk for one or more systems in a vulnerability path and the likelihood that that risk may be exploited in the vulnerability path (step 435).

The security system 405 polls the first and second systems (step 440). In one example, polling the first and second systems may include verifying the intermediary system configuration. The first and second systems provide system information (steps 445 and 450). The security system 405 then identifies a risk for the first and second systems in the vulnerability path (steps 445 and 460).

The security system 405 then determines the intermediary likelihood (step 465) and identifies a risk for the computer system 420 (step 470). Identifying the risk for the computer system 420 includes identifying one or more vulnerabilities that may be used to exploit the computer system 420 through the vulnerability path that includes the first system 410 and the second system 415.

The security system 405 then determines the likelihood that the computer system may be exploited through the vulnerability path (step 475). Determining the likelihood that the computer system may be exploited includes determining the likelihood of the vulnerability occurring on the computer system 420 itself.

The security system determines the cost of an event affecting the computer system (step 480), and quantifies the risk into an impact value by relating the intermediary likelihood with the system likelihood and the cost (step 485). The quantified risk may be translated into an impact value by multiplying the intermediary likelihood with the system likelihood and the cost associated with the computer system 420 being exploited by the risk/vulnerability.

The security system 410 then may display the quantified risk (step 490). Displaying the quantified risk may include displaying the risk as was described with respect to step 385 of FIG. 3. Although not shown, a corrective action may be displayed. The corrective action may be performed on the computer system 420 as well as the first and second systems 410 and 415 in the vulnerability path.

Figure 5:
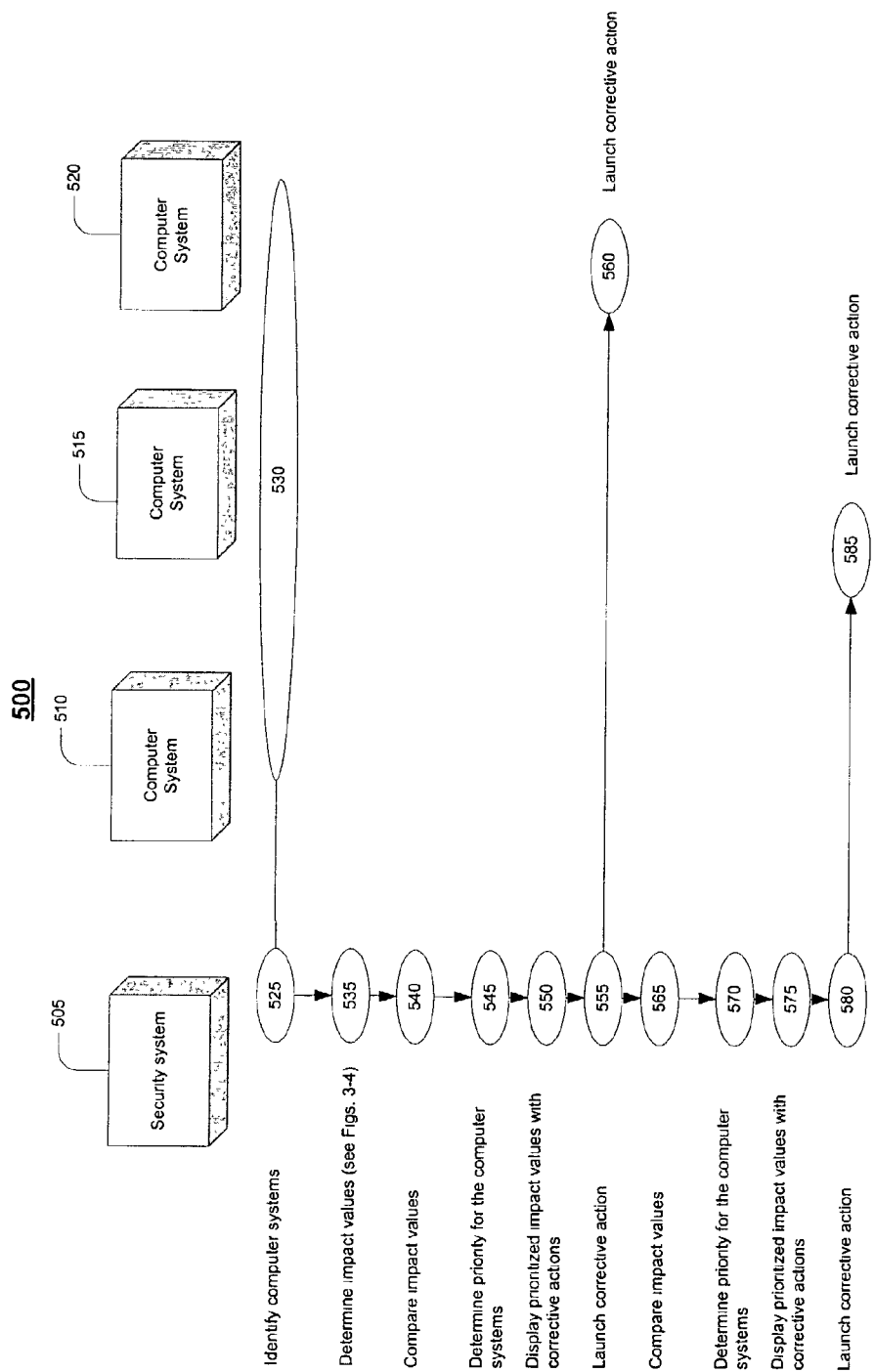
FIG. 5 is a flow chart showing how risks associated with multiple computer systems may be compared.

FIG. 5 illustrates a flow chart 500 showing how risks associated with multiple computer systems may be compared and displayed. The display enables a manager to receive information related to the prioritized risks and launch corrective action based on the selected action. Generally, the systems shown in flow chart 500 relate to the systems described previously in FIGS. 1-4. For example, the security system 505 may relate to the security systems 310 and 405 in FIGS. 3 and 4. Similarly, the computer systems 510, 515, and 520 may relate to the host system 110, the database 250, and the computer systems 330 and 420 described in FIGS. 1-4.

Initially, the security system 505 may identify two or more computer systems (step 525). For example, the security system 505 may poll a configuration database to identify computer systems 510, 515, and 520 (step 530). The security system 505 determines the impact values (step 535). Typically, determining the impact values includes determining the impact values as was described in FIGS. 3 and 4. This may include using a vulnerability path of intermediary systems to exploit an end system.

The impact values are compared (step 540). Comparing impact values may include determining a priority (e.g., ranking) for the impact values so that the risks associated with the highest impact values may be prioritized in a display generated for an administrator (step 545). Comparing the impact values may include comparing the impact values against a threshold. Risks with impact values below the threshold may be filtered and excluded from the display transmitted to the administrator.

In any event, the prioritized impact values are displayed with corrective actions for the risks (step 550). Displaying a corrective action may include displaying how the risk may be addressed. The corrective action may be launched in a computer manner to task support personnel. For example, the manager may interface with a graphical user interface and select an icon. Selecting the icon may generate a message that is transmitted to support personnel.

In any event, whether launched in a computer manner or otherwise, a corrective action is launched (step 555). Generally, a corrective action includes launching one or more operations to address the risk. For example, a software patch may be installed or a traffic profile on a firewall may be blocked. In another example, the risk may be acknowledged without any action taken. If the risk is acknowledged, the risk may be removed from the prioritized display. Alternatively, the risk may be acknowledged, but appear in a display, with the appearance of the risk icon modified to reflect the acknowledgement. As is shown in flow chart 500, the corrective action addresses a risk associated with computer system 520 (step 560).

The security system 505 compares the impact values (step 565) and determines priorities for the computer systems (step 570) for risks remaining after a corrective action has been performed (step 560). For example, the display of risks and computer systems may remove the icon associated with computer system 520 after that related corrective action has been performed. The prioritized impact values and corrective actions are displayed (step 575). As a result of this second display (step 575), the security system 505 may launch a corrective action (step 580). In this example, computer system 515 undergoes corrective action (step 585).

FIG. 6 illustrates a GUI 600 ("Graphical User Interface") with icons graphically representing risk. GUI 600 is an exemplary display that may be used with the risk management operations described previously with respect to FIGS. 3-5. For example, GUI 600 may be generated in the display used in step 525 to review risk that has been identified and analyzed.

GUI 600 includes icons 610, 620, and 630. Each icon includes a description of the computer system, an assessment of the risk, a description of the risk, and an impact value. Each icon also includes a corrective action button that enables corrective action to be taken. For example, icon 610 describes a weak password vulnerability on an e-commerce server with an impact value of $100,000. Similarly, icon 620 describes a vulnerability 123 on a customer account server with an impact value of $50,000. Finally, icon 630 describes an internal configuration vulnerability on a DNS server with an impact value of $1,000. Each of the three icons includes the corrective action buttons.

Although the risk management tool (e.g., the security system) has been described with respect to modeling an actual network that is used to launch corrective action, the risk management tool described previously also may be used in modeling software and/or a consulting environment.

For example, the risk management tool may be used to design a network. In one example, designing a network may include designing a hypothetical network. Designing a hypothetical network may include designing a network with general classes of equipment. For example, one computer system may represent a class of web servers while another computer system represents a class of client systems. These groups may be expanded further to identify particular or planned systems. An organization may know that one particular web server will be used and that other web servers will likely be used. This may be modeled as two computer systems: one for the known system and one for the remainder.

In other examples, a consultant may use an actual network as a starting point or baseline from which to consider network modifications. A consultant may acquire an organization snapshot, for example by surveying the network, and assess the risk from the existing computer systems.

Regardless of whether the network and computer systems being considered actually exist are proposed, or are a hybrid of actual and theoretical systems, the risk management tool may be used to explore alternative configurations. For example, a consultant may consider a network of computer systems that are presently without a firewall. The consultant then may modify the model to reflect the addition of a firewall. The firewall may modify the risks and impact values for multiple computer systems that are protected by the firewall. In another example, the consultant may explore the effect on impact values of adding a remote access modem bank situated behind a firewall. The remote access modem bank may increase the risks and impact values by providing a path through which the firewall may be circumvented.

Alternatives and configuration changes may be modeled in the risk management system. Examples of factors that may be changed in the model may include the operating system, the application, the location, and/or the configuration (e.g., system settings). Other factors that may be modeled include the effect of using stronger authentication measures. For example, the risk management system may model the effect of using stronger security or authentication measures (e.g., stronger and longer passwords, or using a one-time number generator such as a SecurID™ token). Other security measures that may be modeled may include further limiting user permissions and access rights.

The consultant may use a companion database (e.g., security database 320). This companion database may include elements modeled from experience, empirical data, and analyses to represent the components that may be used in a complex system. The consultant may interface with a manager to better determine the costs and impact values. For example, if the value for a host is difficult to ascertain, the determined value may be retained for subsequent use. Similarly, if the cost changes, the costs may be updated.

Other implementations are within the scope of the following claims. For example, one implementation may include a hierarchy of risk management domains with each domain representing a data center or region of equipment. For example, all east coast servers may be grouped in a first domain and all west coast servers may be grouped in a second domain. A proxy may aggregate the results for each domain and selectively filter the most important risks to a consolidated manager. Other domains may be organized functionally. For example, all web servers may reside in a first domain and all PC clients may reside in a second domain.

The risk may be divided by identifying different sources of risk. For example, some sources of risk may be identified as originating from internal users. Other sources of risk may be associated with threats originating from the Internet. This granular source identification may be used to better identify solutions. For example, adding a firewall may reduce the risks of Internet threats while controlling user access privileges may be successful for addressing risks originating internally.

More than one vulnerability path may be analyzed. For example, multiple paths may be considered for each potential intrusion to determine the risk for each type of intrusion. From each intrusion risk, other systems that may be exploited may be identified. For example, if a "front line" of at risk computer systems is compromised, a second line of computer systems may be exposed to other risks. Subsequent paths may be iteratively explored to identify additional risks. For example, if a first system is exploited, a group of second systems may be susceptible to risks. Each of the computer systems in the second group of second systems may be explored to identify a third group of systems that may be exploited from this second group of systems. This may continue for additional layers.

Exploring the vulnerability paths may be modeled in symbolic logic. Elements in this symbolic logic may use expressions to simulate components, relationships, and vulnerabilities. This symbolic logic may be parsed and manipulated to evaluate alternative configurations. For example, evaluating a new network configuration may be modeled by substituting a first logical expression with a second logical expression. Similarly, instead of symbolic logic, object-oriented code may be used to model risk. Objects may represent components in a network. In processing the object-oriented code, each of these objects may iteratively receive threat messages being sent to explore vulnerability paths.

What is claimed is:

1. A computer-implemented method of quantifying a security risk associated with a computer system, the method comprising:

identifying a computer system;

analyzing an actual configuration of the computer system by:

identifying a vulnerability path of one or more intermediary systems, the vulnerability path comprising a sequence of vulnerabilities in which a first event must interrupt a normal operating mode on a first system before a second event may occur on a second system;

identifying a risk for the actual configuration associated with the computer system, the risk relating to an event that may interrupt a normal operating mode of the computer system as a result of the vulnerability path being exploited;

determining a likelihood for the actual configuration that the event associated with the risk for the actual configuration will occur;

determining a cost for the actual configuration associated with the event occurring on the computer system; and quantifying the risk into an impact value by using the likelihood for the actual configuration and the cost for the actual configuration;

accessing the actual configuration for the computer system;

analyzing an alternative configuration for the computer system by:

enabling a user to modify the actual configuration to create the alternative configuration;

identifying, using the alternative configuration, an alternative path of one or more intermediary systems, the alternative path comprising a sequence of vulnerabilities in the alternative configuration;

identifying an alternative risk associated with the alternative configuration;

determining an alternative likelihood that an event associated with the alternative risk will occur; and determining an alternative cost associated with the alternative configuration;

quantifying the alternative risk into an alternative value by using the alternative likelihood and the alternative cost; and enabling the user to perceive the impact value for the actual configuration and the alternative value for the alternative configuration.

2. The method of claim 1 wherein determining the likelihood for the actual configuration comprises accessing a data store of risks and associated likelihoods.

3. The method of claim 1 wherein identifying a computer system comprises identifying multiple computer systems by determining a configuration of a network of computer systems.

4. The method of claim 1 wherein the cost for the actual configuration relates to expected damages if the event occurred.

5. The method of claim 1 wherein determining the likelihood for the actual configuration comprises analyzing past security events.

6. The method of claim 1 further comprising:
identifying an intermediary risk associated with the intermediary systems along the vulnerability path, and
determining an intermediary likelihood that an event associated with the intermediary risk may occur.

7. The method of claim 1 further comprising quantifying the risk for an end system accessible through the vulnerability path by using the intermediary likelihood, a likelihood for the end system, and the cost associated with the event occurring on the end system along the vulnerability path.

8. The method of claim 1 further comprising displaying the impact value.

9. The method of claim 8 wherein displaying the impact value includes calculating and displaying multiple impact values.

10. The method of claim 9 wherein displaying the impact values comprises displaying the impact values in order of priority.

11. The method of claim 8 further comprising displaying the impact value along with a corrective action to address the risk.

12. The method of claim 1 wherein displaying the corrective action includes displaying a resource requirement to perform the corrective action.

13. The method of claim 1 wherein identifying the risk for the actual configuration comprises probing the computer system with a software application designed to check for vulnerabilities.

14. The method of claim 1 further comprising comparing multiple impact values to create a prioritized vulnerability list.

15. The method of claim 1 wherein identifying a computer system includes creating a model of a computer system that does not physically exist.

16. The method of claim 1 wherein the event includes failing to detect a hostile action.

17. A system configured to quantify a security risk associated with a computer system, the system comprising:
an identifying processor structured and arranged to:
identify a computer system and
analyze an actual configuration of the computer system;
a path processor structured and arranged to identify a vulnerability path of one or more intermediary systems, the vulnerability path comprising a sequence of vulnerabilities in which a first event must interrupt a normal operating mode on a first system before a second event may occur on a second system;
a risk processor structured and arranged to identify a risk for the actual configuration associated with the computer system, the risk relating to an event that may interrupt a normal operating mode of the computer system as a result of the vulnerability path being exploited;
a likelihood processor structured and arranged to determine a likelihood for the actual configuration that the event associated with the risk for the actual configuration will occur;
a cost processor structured and arranged to determine a cost for the actual configuration associated with the event occurring on the computer system; and
an impact value processor structured and arranged to quantify the risk into an impact value by using the likelihood for the actual configuration and the cost for the actual configuration
an alternative configuration processor structured and arranged to:
access the actual configuration for the computer system;
analyze an alternative configuration for the computer system by:
enable a user to modify the actual configuration to create the alternative configuration;
identify, using the alternative configuration, an alternative path of one or more intermediary systems, the alternative path comprising a sequence of vulnerabilities in the alternative configuration;
identify an alternative risk associated with the alternative configuration;
determining an alternative likelihood that an event associated with the alternative risk will occur; and
determine an alternative cost associated with the alternative configuration;
quantifying the alternative risk into an alternative value by using the alternative likelihood and the alternative cost; and
enable the user to perceive the impact value for the actual configuration and the alternative value for the alternative configuration.

18. The system of claim 17 wherein the likelihood processor is structured and arranged to access a data store of risks and associated likelihoods.

19. The system of claim 17 wherein the identifying processor is structured and arranged to identify multiple computer systems by determining a configuration of a network of computer systems.

20. The system of claim 17 wherein the cost processor is structured and arranged to determine a cost for the actual configuration that relates to expected damages if the event occurred.

21. The system of claim 17 wherein the likelihood processor is structured and arranged to analyze past security events for the actual configuration.

22. The system of claim 17 further comprising:
an intermediary risk processor structured and arranged to identify an intermediary risk associated with the intermediary systems along the vulnerability path, and
an intermediary likelihood processor structured and arranged to determine an intermediary likelihood that an event associated with the intermediary risk may occur.

23. The system of claim 17 further comprising a second impact value processor structured and arranged to quantify the impact value for an end system accessible through the vulnerability path by using the intermediary likelihood, a likelihood for the end system, and the cost associated with the event occurring on the end system.

24. The system of claim 17 wherein the impact value processor is structured and arranged to calculate and display multiple impact values.

25. The system of claim 24 wherein the impact value processor is structured and arranged to display the impact values in order of priority.

26. The system of claim 17 further comprising a corrective action processor structured and arranged to display the impact value along with a corrective action to address the risk.

27. The system of claim 17 wherein the corrective action processor is structured and arranged to display a resource requirement to perform the corrective action.

28. The system of claim 17 wherein the identifying processor is structured and arranged to identify the risk for the actual configuration by probing the computer system with a software application designed to check for vulnerabilities.

29. The system of claim 17 further comprising a comparing processor structured and arranged to compare multiple impact values to create a prioritized vulnerability list.

30. The system of claim 17 wherein the identifying processor is structured and arranged to create a model of a computer system that does not physically exist.

31. The system of claim 17 wherein the event includes failing to detect a hostile action.

32. A system configured to quantify a security risk associated with a computer system, the system comprising:
   means for identifying a computer system;
   means for analyzing an actual configuration of the computer system by:
      identifying a vulnerability path of one or more intermediary systems, the vulnerability path comprising a sequence of vulnerabilities in which a first event must interrupt a normal operating mode on a first system before a second event may occur on a second system;
      identifying a risk for the actual configuration associated with the computer system, the risk relating to an event that may interrupt a normal operating mode of the computer system as a result of the vulnerability path being exploited;
      determining a likelihood for the actual configuration that the event associated with the risk for the actual configuration will occur;
      determining a cost for the actual configuration associated with the event occurring on the computer system;
      quantifying the risk into an impact value by using the likelihood for the actual configuration and the cost for the actual configuration;
   means for accessing the actual configuration for the computer system;
   means for analyzing an alternative configuration for the computer system by:
      enabling a user to modify the actual configuration to create the alternative configuration;
      identifying, using the alternative configuration, an alternative path of one or more intermediary systems, the alternative path comprising a sequence of vulnerabilities in the alternative configuration;
      identifying an alternative risk associated with the alternative configuration;
      determining an alternative likelihood that an event associated with the alternative risk will occur; and
      determining an alternative cost associated with the alternative configuration;
      quantifying the alternative risk into an alternative value by using the alternative likelihood and the alternative cost; and
   means for enabling the user to perceive the impact value for the actual configuration and the alternative value for the alternative configuration.

33. A computer program on a computer-readable medium configured to quantify a security risk associated with a computer system, comprising:
   a first code segment structured and arranged to:
      identify a computer system; and
      analyze an actual configuration of the computer system;
   a path code segment structured and arranged to identify a vulnerability path of one or more intermediary systems, the vulnerability path comprising a sequence of vulnerabilities in which a first event must interrupt a normal operating mode on a first system before a second event may occur on a second system;
   a second code segment structured and arranged to identify a risk for the actual configuration associated with the computer system, the risk for the actual configuration relating to an event that may interrupt a normal operating mode of the computer system as a result of the vulnerability path being exploited;
   a third code segment structured and arranged to determine a likelihood for the actual configuration that the event associated with the risk for the actual configuration will occur;
   a fourth code segment structured and arranged to determine a cost for the actual configuration associated with the event occurring on the computer system;
   a fifth code segment structured and arranged to quantify the risk for the actual configuration into an impact value by using the likelihood for the actual configuration and the cost for the actual configuration;
   a sixth code segment structured and arranged to access the actual configuration for the computer system;
   a seventh code segment structured and arranged to analyze an alternative configuration for the computer system by:
      enabling a user to modify the actual configuration to create the alternative configuration;
      identifying, using the alternative configuration, an alternative path of one or more intermediary systems, the alternative path comprising a sequence of vulnerabilities in the alternative configuration;
      identifying an alternative risk associated with the alternative configuration; determining an alternative likelihood that an event associated with the alternative risk will occur; and
      determining an alternative cost associated with the alternative configuration;
      quantifying the alternative risk into an alternative value by using the alternative likelihood and the alternative cost; and
   an eighth code segment structured and arranged to enable the user to perceive the impact value for the actual configuration and the alternative value for the alternative configuration.

* * * * *